United States Patent
Arai et al.

(10) Patent No.: US 8,045,111 B2
(45) Date of Patent: Oct. 25, 2011

(54) METHOD OF MANUFACTURING LIQUID CRYSTAL DISPLAY DEVICE

(75) Inventors: Norihiro Arai, Hino (JP); Ryota Mizusako, Sagamihara (JP)

(73) Assignee: Casio Computer Co., Ltd., Tokyo (JP)

( * ) Notice: Subject to any disclaimer, the term of this patent is extended or adjusted under 35 U.S.C. 154(b) by 357 days.

(21) Appl. No.: 12/412,536

(22) Filed: Mar. 27, 2009

(65) Prior Publication Data

US 2009/0244460 A1 Oct. 1, 2009

(30) Foreign Application Priority Data

Mar. 31, 2008 (JP) ................................. 2008-093156
Mar. 17, 2009 (JP) ................................. 2009-064476

(51) Int. Cl.
  *G02F 1/1337* (2006.01)
  *G02F 1/1339* (2006.01)
(52) U.S. Cl. ................ 349/126; 349/123; 349/190
(58) Field of Classification Search ................ None
  See application file for complete search history.

(56) References Cited

U.S. PATENT DOCUMENTS

| | | | | |
|---|---|---|---|---|
| 5,276,541 A | * | 1/1994 | Terada et al. | 349/190 |
| 6,417,908 B2 | * | 7/2002 | Nishiguchi et al. | 349/155 |
| 7,180,568 B2 | * | 2/2007 | Lee et al. | 349/190 |
| 7,271,904 B2 | * | 9/2007 | Jung et al. | 356/394 |
| 2002/0030783 A1 | * | 3/2002 | Taniguchi | 349/153 |
| 2004/0114094 A1 | * | 6/2004 | Kim et al. | 349/187 |
| 2004/0263769 A1 | * | 12/2004 | Lee et al. | 349/187 |
| 2005/0190316 A1 | | 9/2005 | Takahashi et al. | |

FOREIGN PATENT DOCUMENTS

| | | |
|---|---|---|
| JP | 5-100233 A | 4/1993 |
| JP | 2774714 B2 | 4/1998 |
| JP | 10-186340 A | 7/1998 |
| JP | 2003-266631 A | 9/2003 |
| JP | 2004-219948 A | 8/2004 |
| JP | 2005-241923 A | 9/2005 |
| JP | 2006-17835 A | 1/2006 |

OTHER PUBLICATIONS

Japanese Office Action dated Apr. 13, 2010 and English translation thereof issued in counterpart Japanese Application No. 2009-064476.

* cited by examiner

*Primary Examiner* — Tina Wong
(74) *Attorney, Agent, or Firm* — Holtz, Holtz, Goodman & Chick, P.C.

(57) ABSTRACT

A method of manufacturing a liquid crystal display device includes steps of preparing first and second substrates, forming alignment films on one surfaces of the first and second substrates, respectively, performing rubbing treatment on the alignment films, screen-printing a seal member on the one surface of the first substrate so as to surround a display area, and stacking the first and second substrates on each other while the first surfaces face to each other, with rubbing directions of the alignment films on the first and second substrates being parallel to each other, and joining the first and second substrates through the seal member by curing the seal member while the first and second substrates are bonded to each other through the seal member. The screen-printing is performed while a squeegee is moved in a direction parallel to the rubbing direction of the alignment film formed on the first substrate.

11 Claims, 6 Drawing Sheets

METHOD OF MANUFACTURING LIQUID CRYSTAL DISPLAY DEVICE

CROSS-REFERENCE TO RELATED APPLICATIONS

This application is based upon and claims the benefit of priority under 35 USC 119 of Japanese Patent Applications No. 2008-093156 filed on Mar. 31, 2008; and No. 2009-064476 filed on Mar. 17, 2009, the entire disclosure of which, including the description, claims, drawings, and abstract, is incorporated herein by reference in its entirety.

BACKGROUND OF THE INVENTION

1. Field of the Invention

The present invention relates to a method of manufacturing a liquid crystal display device.

2. Description of the Related Art

In manufacturing a liquid crystal display device, after rubbing treatment is performed on alignment films respectively formed on the inner surfaces of a pair of substrates, a seal member for joining the pair of substrates is printed on the inner surface of one of the substrates by screen printing using a screen which masks a non-print area and a squeegee which is brought into contact with the screen and moved in a predetermined direction. In this case, during printing of the seal member, the surface of the alignment film which has undergone rubbing treatment is partially worn by the screen.

In order to solve this problem, for example, a method of manufacturing a liquid crystal display device is disclosed in Japanese Patent No. 2774714. In manufacturing a liquid crystal display device such as a TN or STN liquid crystal display device in which the liquid crystal molecules of a liquid crystal layer are twisted/aligned between a pair of substrates by performing rubbing treatment on the alignment films formed on the inner surfaces of the pair of substrates in directions crossing each other at a predetermined angle, according to this method, even if the surface of an alignment film which has undergone rubbing treatment is partially worn by the screen, the influence of this wear on the twist alignment of the liquid crystal molecules is prevented by performing screen printing of the seal member while moving the squeegee in a direction crossing the rubbing direction of the alignment film formed on the substrate on which the seal member is printed at an angle larger than 90°.

The conventional manufacturing method, in which a seal member is printed by moving the squeegee in a direction crossing the rubbing direction of an alignment film at an angle larger than 90° as described above, is effective in manufacturing a liquid crystal display device having liquid crystal molecules twisted/aligned. However, in manufacturing an untwisted/aligned liquid crystal display device in which the molecular long axes of the liquid crystal molecules of a liquid crystal layer are aligned with the rubbing directions of the alignment films respectively formed on the opposed inner surfaces of a pair of substrates by performing rubbing treatment on the alignment films in parallel directions, the difference between the rubbing direction of each alignment film and the direction in which the film is worn by the screen influences the alignment of the liquid crystal molecules to disturb the alignment of the liquid crystal molecules.

BRIEF SUMMARY OF THE INVENTION

A method of manufacturing a liquid crystal display device according to the present invention includes steps of:

preparing a first substrate and a second substrate;

forming alignment films on one surface of the first substrate and one surface of the second substrate, respectively;

performing rubbing treatment on a surface of each of the alignment films;

screen-printing a seal member on said one surface of the first substrate so as to surround a display area; and stacking the first substrate and the second substrate on each other while said one surface of the first substrate faces said one surface of the second substrate, with a rubbing direction of the alignment film on the first substrate being parallel to a rubbing direction of the alignment film on the second substrate, and joining the first substrate and the second substrate through the seal member by curing the seal member while the first substrate and the second substrate are bonded to each other through the seal member.

In the step of screen-printing the seal member, printing is performed while a squeegee which is brought into contact with a screen and moved in a predetermined direction is moved in a direction parallel to the rubbing direction of the alignment film formed on said one surface of the first substrate.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be explained with reference to the drawings.

First Embodiment

Figure 1:
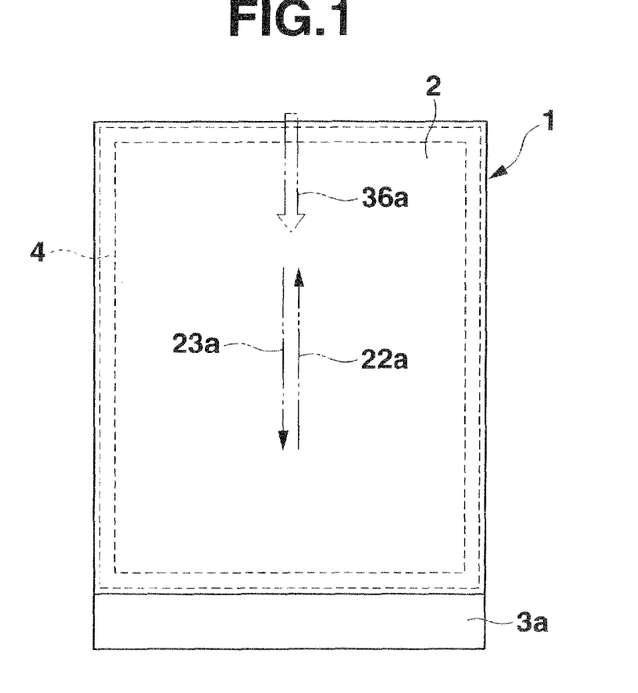
FIG. 1 is a plan view of a liquid crystal display device to be manufactured according to the first embodiment of the present invention.
Figure 2:
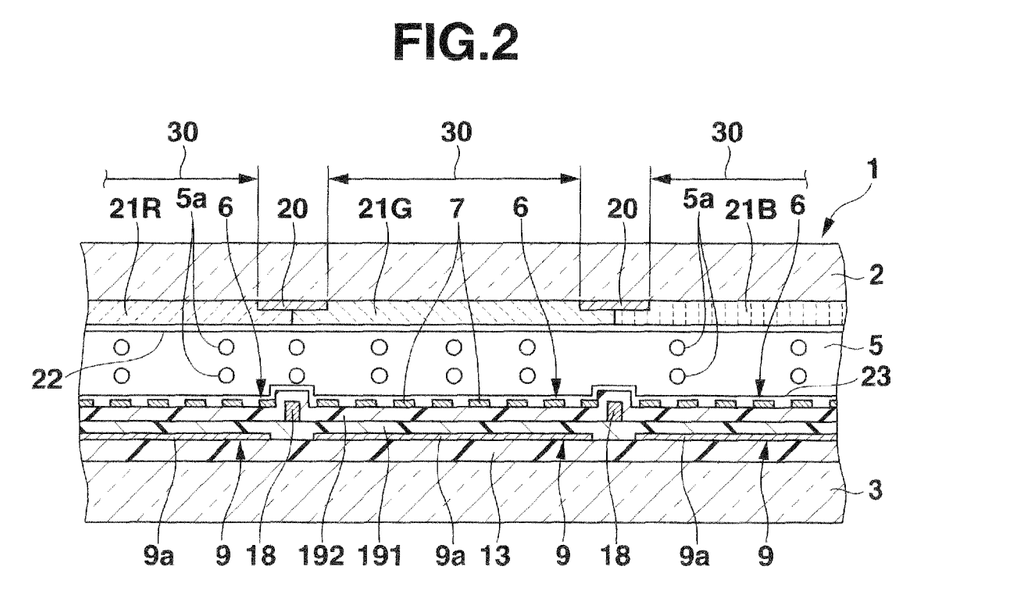
FIG. 2 is a sectional view taken along a line II-II of the liquid crystal display device according to the first embodiment in FIG. 3.
Figure 3:
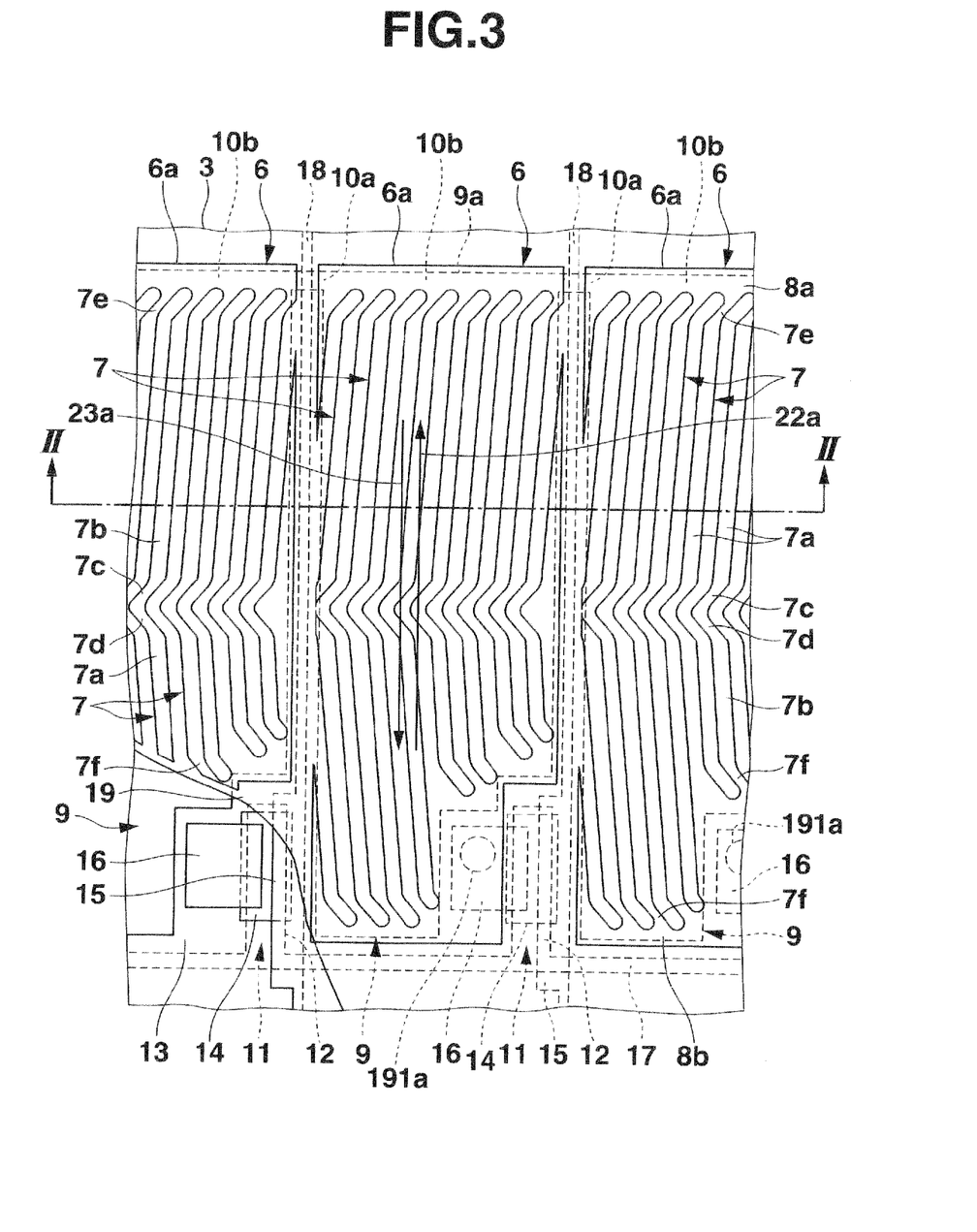
FIG. 3 is an enlarged plan view of part of one of the substrates of the liquid crystal display device according to the first embodiment.
Figure 4:
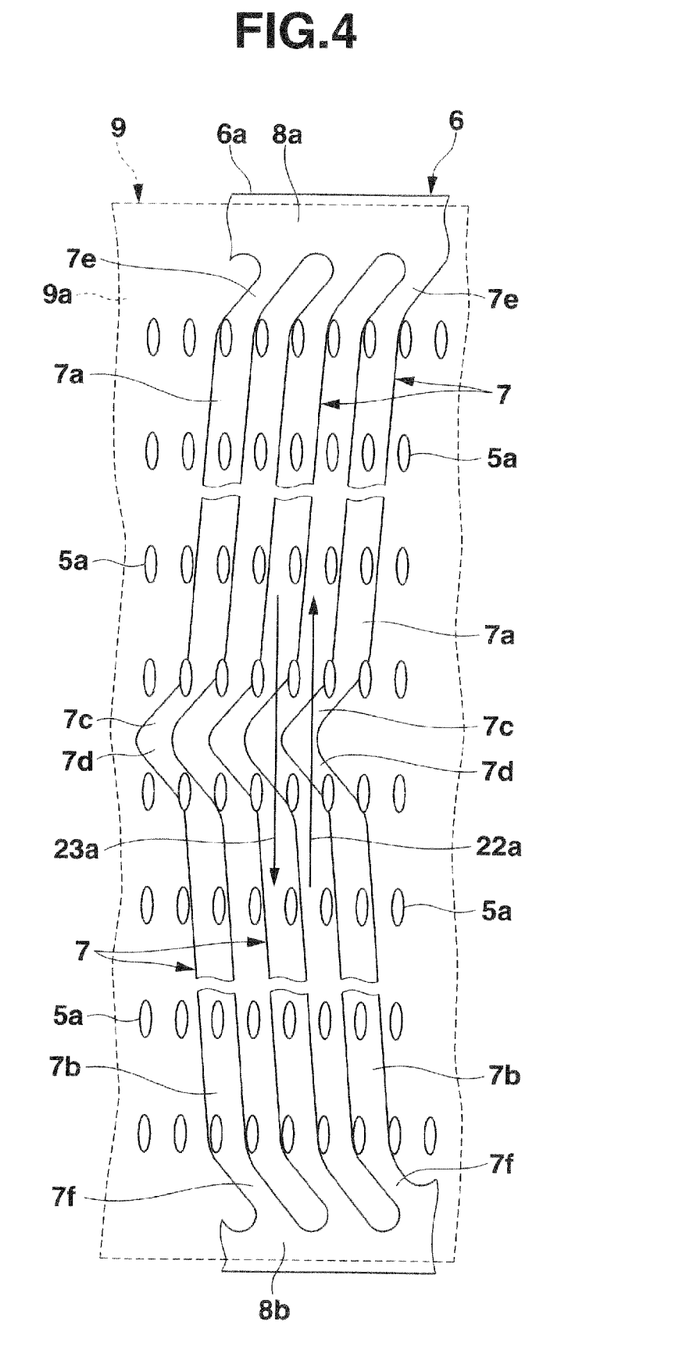
FIG. 4 is an enlarged plan view showing the shapes of the first and second electrodes forming one pixel of the liquid crystal display device according to the first embodiment and the aligned state of liquid crystal molecules.
Figure 5:
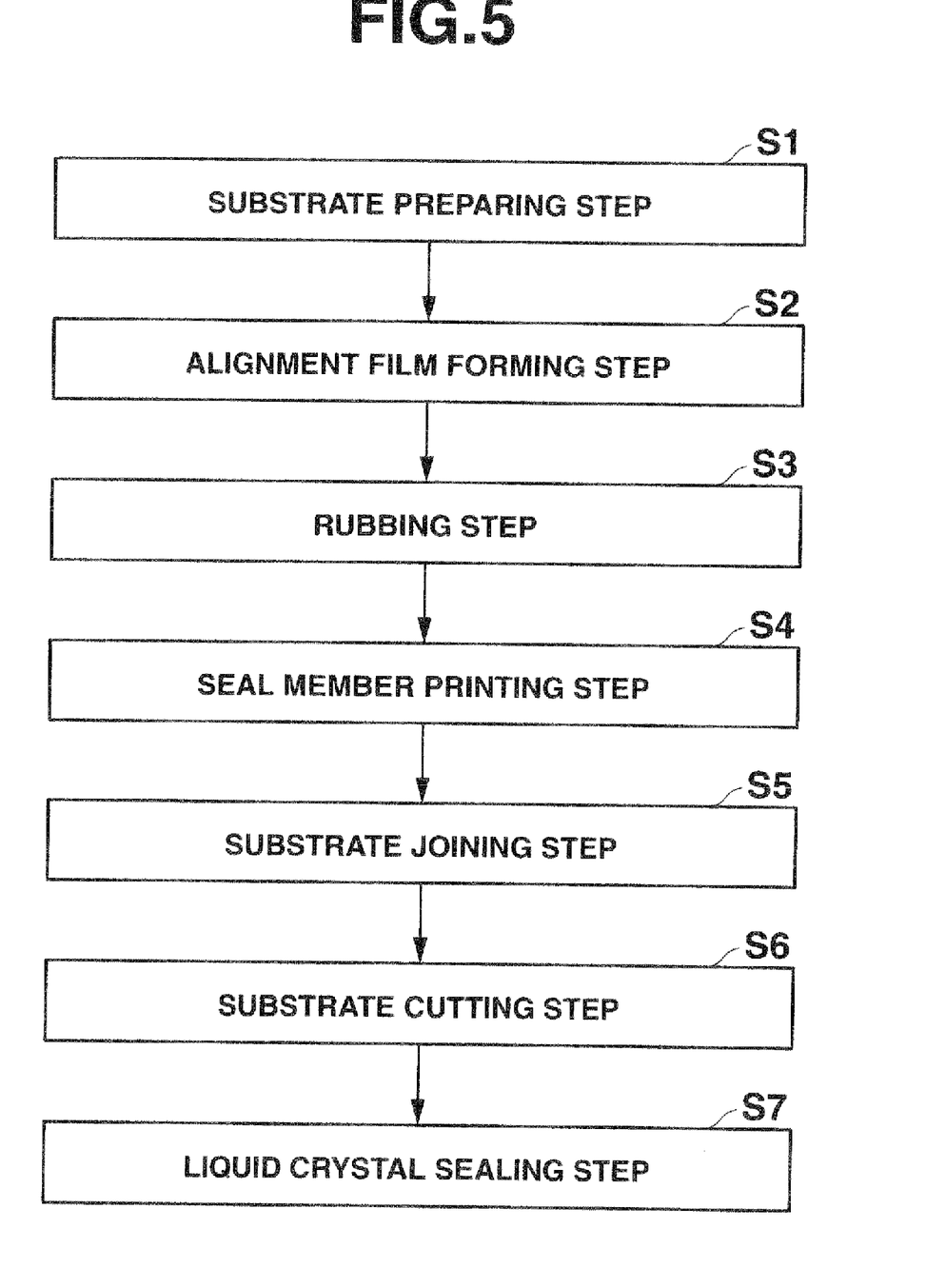
FIG. 5 is a flowchart showing a manufacturing process for the liquid crystal display device according to the first embodiment.

FIGS. 1 to 6 show the first embodiment of the present invention. FIG. 1 is a plan view of a liquid crystal display device to be manufactured. FIG. 2 is a sectional view taken along a line II-II of a liquid crystal display device according to the first embodiment in FIG. 3. FIG. 3 is an enlarged plan view of part of one of the substrates of the liquid crystal display device according to the first embodiment. FIG. 4 is an enlarged plan view showing the shapes of the first and second electrodes forming one pixel of the liquid crystal display device according to the first embodiment and the aligned state of liquid crystal molecules. FIG. 5 is a flowchart showing the manufacturing process of the liquid crystal display device according to the first embodiment. FIGS. 6A and 6B are sectional views each showing a printing method for a seal member on the liquid crystal display device according to the first embodiment.

A liquid crystal display device to be manufactured will be described first. A liquid crystal display device 1 according to this embodiment is an untwisted/aligned liquid crystal display device. As shown in FIGS. 1 to 4, this device includes a pair of transparent substrates 2 and 3 joined to each other through a frame-like seal member 4 so as to face each other through a predetermined gap, a liquid crystal layer 5 sealed in the region surrounded by the seal member 4 in the gap between the pair of substrates 2 and 3, electrodes 6 and 9 which are provided on at least one of the opposed inner surfaces of the pair of substrates 2 and 3 so as to respectively correspond to predetermined unit regions for the formation of pixels 30, and generate electric fields which change the molecular long axis direction of liquid crystal molecules 5a of the liquid crystal layer 5, and alignment films 22 and 23 which are respectively formed on the inner surfaces of the pair of substrates 2 and 3 and have undergone rubbing treatment in parallel directions.

Note that the liquid crystal display device 1 according to this embodiment is a lateral electric field control liquid crystal display device. In this device, the first electrodes 6 are arranged on the inner surface of one of the pair of substrates 2 and 3, e.g., a substrate (first substrate to be referred to as a rear substrate hereinafter) 3 on the opposite side to the observation side so as to respectively correspond to the predetermined unit regions for the formation of the pixels 30, with vertically elongated electrode portions 7 being formed parallel on each first electrode at intervals, together with the second electrode 9 which is located closer to the rear substrate 3 than the first electrodes 6 so as to be insulated from the first electrodes 6, and generates lateral electric fields on the elongated electrode portions 7 of the first electrodes 6 upon application of a voltage between the second electrode 9 and the first electrodes 6 so as to change the molecular long axis direction of liquid crystal molecules in a direction parallel to the inner surfaces of the pair of substrates 2 and 3.

In addition, the liquid crystal display device 1 according to this embodiment is an active matrix display device. In this device, of the first and second electrodes 6 and 9 provided on the inner surface of the rear substrate 3 so as to be insulated from each other, the first electrodes 6 on which the elongated electrode portions 7 are formed parallel are pixel electrodes arranged in a matrix form in the row direction (a direction parallel to the horizontal direction of the display area in which the pixels 30 are arranged in a matrix form) and the column direction (a direction parallel to the vertical direction of the display area). The second electrode 9 is an opposed electrode which is placed to correspond to each pixel electrode 6 of each row.

The inner surface of the rear substrate 3 is provided with active elements 11 which are arranged to respectively correspond to the pixels 30 formed from regions where the pixel electrodes 6 correspond to the opposed electrodes 9, scanning lines 17 arranged for each pixel row constituted by the pixels 30 arrayed in the row direction, and signal lines 18 arranged for each pixel column constituted by the pixels 30 arrayed in the column direction.

The active element 11 is, for example, a TFT (Thin-Film Transistor), which includes a gate electrode 12 formed on the inner surface of the rear substrate 3, a transparent gate insulating film 13 formed on almost the entire surface of the rear substrate 3 so as to cover the gate electrode 12, an i-type semiconductor film 14 formed on the gate insulating film 13 so as to face the gate electrode 12, and drain and source electrodes 15 and 16 formed on n-type semiconductor films (not shown) on two side portions of the i-type semiconductor film 14.

The scanning lines 17 are formed on the inner surface of the rear substrate 3 so as to be parallel to the pixel rows along one side (the lower side in FIG. 3) of each pixel row, and are respectively connected to the gate electrodes 12 of the TFTs 11 of each row. The signal lines 18 are formed on the gate insulating film 13 so as to be parallel to the pixel columns along one side (the left side in FIG. 3) of each pixel column, and are respectively connected to the drain electrodes 15 of the TFTs 11 of each column.

Note that a terminal array portion 3a (see FIG. 1) is formed on an edge portion of the rear substrate 3 so as to protrude outside the substrate on the observation side (the second substrate to be referred to as the front substrate) 2. The scanning lines 17 and the signal lines 18 are connected to scanning line terminals and signal line terminals (not shown) provided on the terminal array portion 3a.

The pixel electrodes 6 are formed on a first transparent interlayer dielectric film 191 formed on almost the entire surface of the rear substrate 3 so as to cover the TFTs 11 and the signal lines 18. The opposed electrode 9 is formed on the gate insulating film 13. That is, the opposed electrode 9 is placed closer to the rear substrate 3 than the pixel electrodes 6 so as to be insulated from the pixel electrodes 6 by the first interlayer dielectric film 191.

The pixel electrodes 6 each are formed from a first transparent conductive film (e.g., an ITO film) 6a formed in a predetermined unit region for the formation of one pixel 30, e.g., a vertically elongated rectangular region whose vertical width along the vertical direction of the display area is larger than the horizontal width along the horizontal direction of the display area, with elongated electrode portions 7, each having a length almost equal to the total length of the unit region in the lengthwise direction (a direction parallel to the vertical direction of the display area), being formed parallel in the widthwise direction (a direction parallel to the horizontal direction of the display area) of the unit region at intervals.

As shown in FIGS. 3 and 4, the elongated electrode portions 7 of the pixel electrodes 6 each include an almost linear elongated portion 7a having one end portion placed at a middle portion of the unit region in each pixel 30 in the lengthwise direction and the other end portion placed at one end side of the unit region in the lengthwise direction and an almost linear elongated portion 7b having one end portion placed at the middle portion of the unit region in the lengthwise direction and the other end portion placed at the other end side of the unit region in the lengthwise direction. The other end portion of each of the elongated portions 7a and 7b is placed on the same side relative to one end portion of each of the two elongated portions 7a and 7b in the widthwise direction of the unit region. With this structure, the two elongated portions 7a and 7b each are formed to tilt at an angle of 1° to 20° (preferably 5°) with respect to the lengthwise direction of the unit region.

Almost linear bent portions 7c and 7d are formed at a middle portion of each elongated electrode portion 7 in the lengthwise direction, i.e., between one end portion of the elongated portion 7a and one end portion of the elongated portion 7b. The bent portion 7c has one end portion placed at a middle portion of the unit region in each pixel 30 in the lengthwise direction and the ocher portion placed at a portion connected to one end portion of one elongated portion 7a. The bent portion 7d has one end portion placed at a middle portion of the unit region in the lengthwise direction and the other end portion placed at portion connected to one end portion of the other elongated portion 7b. The tilt angle of the bent portions 7c and 7d with respect to the lengthwise direction of the unit region is larger than that of the elongated portions 7a and 7b. In this case, the lengthwise direction of the elongated electrode portion 7 is a direction parallel to the vertical direction of the display area. The portions where the elongated portions 7a and 7b and the bent portions 7c and 7d are connected to each other are formed into arcuated shapes such that the two side edges of the elongated portion 7a and bent portion 7c and the two side edges of the elongated portion 7b and bent portion 7d are smoothly continuous, respectively.

In addition, each elongated electrode portion 7 has bent end portions 7e and 7f at the two end portions. The tilt angle of the bent end portions 7e and 7f with respect to the lengthwise direction of the unit region is larger than that of the elongated portions 7a and 7b. The portions where the bent end portions 7e and 7f and the elongated portions 7a and 7b are connected to each other are formed into arcuated shapes such that the two side edges of the bent end portion 7e and elongated portion 7a and the two side edges of the bent end portion 7f and elongated portion 7b are smoothly continuous, respectively.

Note that the elongated electrode portions 7 of each pixel electrode 6 are formed by providing slits in the first conductive film 6a. The two ends of each of elongated electrode portions 7 are respectively connected to common connecting portions 8a and 8b formed on the two end edges of the first conductive film 6a.

One end side of the common connection portion 8b at one end edge of the first conductive film 6a (the lower end edge in FIG. 3) is stacked on the first interlayer dielectric film 191 on the source electrode 16 of the TFT 11, and is connected to the source electrode 16 through a contact hole 191a provided in the first interlayer dielectric film 191.

The opposed electrode 9 is formed by patterning a second transparent conductive film (e.g., an ITO film) 9a formed on the entire upper surface of a second interlayer dielectric film 192 into a shape corresponding to the pixels 30. As shown in FIG. 3, in the liquid crystal display device 1 of this embodiment, the opposed electrode 9 is formed by patterning the second transparent conductive film 9a so as to form oblong rectangular portions 10a, each corresponding to the shape of each of the pixels 30 of each pixel row and having a vertically elongated rectangular shape, and common connecting portions 10b which connect adjacent ones of the oblong rectangular portions 10a of each pixel row. In this case, the common connecting portions 10b are arranged on one end side (the opposite side to the side on which the scanning lines 17 are provided) of the opposed electrode 9.

The common connecting portions 10b are formed to cross over the signal lines 18. The intersections between the common connecting portions 10b and the signal lines 18 are insulated by the interlayer dielectric film 192 covering the signal lines 18.

The combinations of the oblong rectangular portions 10a, which are connected to each other, and the common connecting portions 10b correspond to the respective pixel rows. Adjacent ones of the combinations are connected to each other through conductive connecting portions (not shown) on the outside of one end side of the display area. The conductive connecting portions are connected to opposed electrode terminals (not shown) provided on the terminal array portion 3a of the rear substrate 3.

The opposed electrode 9 generates an electric field between the respective pixel electrodes 6 and the elongated electrode portions 7 upon application of a voltage between the opposed electrode 9 and the pixel electrodes 6. The electric field generated at this time includes a lateral electric field, in the liquid crystal layer 5 above each pixel electrode 6, which changes the molecular long axis direction of the liquid crystal molecules 5a, of the liquid crystal molecules 5a of the liquid crystal layer 5, which exist in a region overlapping pixel electrodes 6 to a direction parallel to the inner surfaces of the substrates 2 and 3.

Light-shielding films 20 are formed on the inner surface of the front substrate (the substrate on the observation side) 2 so as to overlap the regions between adjacent ones of the pixels 30 and the TFTs 11. Color filters 21R, 21G, and 21B of three colors, i.e., red, green, and blue, are provided on the light-shielding films 20 so as to correspond to the respective pixels 30.

The alignment film 22 is formed on the color filters 21R, 21G, and 21B (on the side of the substrate 2 on which the liquid crystal layer 5 is present) on the inner surface of the substrate 2. The alignment film 23 is formed on the pixel electrodes 6 and the first interlayer dielectric film 191 (on the side of the substrate 3 on which the liquid crystal layer 5 is present) on the inner surface of the substrate 3. The alignment films 22 and 23 are homogeneous alignment films made of, e.g., polyimide films which have an alignment characteristic that aligns the molecular long axes of the liquid crystal molecules 5a of the liquid crystal layer 5 in a direction parallel to the inner surfaces of the substrates 2 and 3. The alignment film 22 on the inner surface of the front substrate 2 is formed in the entire region corresponding to the display area in which the pixels 30 are arranged in a matrix form in the row and column directions so as to cover the color filters 21R, 21G, and 216B. Like the alignment film 22, the alignment film 23 on the inner surface of the rear substrate 3 is formed in the entire region corresponding to the display area so as to cover the pixel electrodes 6.

The film surfaces of the alignment films 22 and 23 are subjected to rubbing treatment in a direction along the lengthwise direction of the elongated electrode portions 7 of each pixel electrode 6, i.e., a direction parallel to the vertical direction of the display area. Referring to FIGS. 1, 3, and 4, an arrow line 22a indicates the rubbing direction of the alignment film 22 on the inner surface of the front substrate 2, and an arrow line 23a indicates the rubbing direction of the alignment film 23 on the inner surface of the rear substrate 3.

The liquid crystal layer 5 sealed in the region surrounded by the frame-like seal member 4 in the gap between the pair of substrates 2 and 3 comprises a nematic liquid crystal having a positive dielectric anisotropy. As shown in FIG. 4, the liquid crystal molecules 5a are aligned parallel to the inner surfaces of the substrates 2 and 3 while the molecular long axes are aligned with rubbing directions 22a and 23a of the alignment films 22 and 23 respectively formed on the inner surfaces of the pair of substrates 2 and 3. In this case, the molecular long axes of the liquid crystal molecules 5a are pre-tilted, relative to the inner surface of the rear substrate 3, in a direction in which the end point side (the lower side in FIG. 4) of the rubbing direction 23a of the alignment film 23 on the inner surface of the rear substrate 3 is more distant from the rear substrate 3 than the start point side (the upper side in FIG. 4), and are pre-tilted, relative to the inner surface of the front substrate 2, in a direction in which the end point side (the upper side in FIG. 4) of the rubbing direction 22a of the alignment film 22 on the inner surface of the front substrate 2 is more distant from the front substrate 2 than the start point side (the lower side in FIG. 4).

Although not shown in FIGS. 1 and 2, the liquid crystal display device 1 includes a pair of polarizing plates which are respectively arranged on the outer surfaces of the pair of substrates 2 and 3. These polarizing plates are arranged such that the transmission axis of one polarizing plate is parallel or perpendicular to the rubbing directions 22a and 23a of the alignment films 22 and 23, and the transmission axis of the other polarizing plate is perpendicular or parallel to the transmission axis of one polarizing plate.

The liquid crystal display device 1 generates an electric field between the elongated electrode portions 7 of each pixel electrode 6 and the opposed electrode 9 by applying a driving voltage corresponding to display data between each pixel electrodes 6 of the pixels 30 and the opposed electrode 9. The electric field generated al this time includes a lateral electric field which changes the molecular long axis direction of the liquid crystal molecules 5a, of the liquid crystal molecules 5a of the liquid crystal layer 5, which exist above each pixel electrode 6, to a direction parallel to the inner surfaces of the substrates 2 and 3, in the liquid crystal layer 5 existing in a region located above each pixel electrode 6 and overlaps each pixel electrode 6. The liquid crystal display device 1 displays an image on the display area by controlling the molecular long axis direction of the liquid crystal molecules 5a corresponding to each pixel 30 within a plane parallel to the inner surfaces of the substrates 2 and 3 using this lateral electric field.

The driving voltage to be applied between the pixel electrodes 6 and the opposed electrode 9 is controlled in accordance with display data within the range from a minimum value of 0 V which does not generate the above lateral electric field to a maximum value which generates the lateral electric field having a strength that aligns the molecular long axes of the liquid crystal molecules 5a in a region overlapping a region including the elongated portions 7a and 7b of each elongated electrode portion 7 of each pixel electrode 6 in directions at an angle of 45° with respect to the rubbing directions 22a and 23a of the alignment films 22 and 23 within a plane parallel to the inner surfaces of the substrates 2 and 3.

On the liquid crystal display device 1 in a normally dark display (normally black) mode in which, for example, one pair of polarizing plates on the outer surface of the front substrate 2 are arranged such that their transmission axes are perpendicular to each other, in the non-electric field mode in which the lateral electric field is not generated between the pixel electrodes 6 and the opposed electrode 9, the molecular long axes of the liquid crystal molecules 5a are aligned along the rubbing directions 22a and 23a of the alignment films 22 and 23, as shown in FIG. 4, the corresponding pixel 30 provides black display. When a lateral electric field having a strength that aligns the molecular long axes of the liquid crystal molecules 5a existing in a region overlapping a region including the elongated portions 7a and 7b of each elongated electrode portion 7 of each pixel electrode 6 in a direction at an angle of 45° with respect to the rubbing directions 22a and 23a of the alignment films 22 and 23 within a plane parallel to the inner surfaces of the substrates 2 and 3 is generated between the pixel electrodes 6 and the opposed electrode 9, the corresponding pixel 30 provides brightest display.

Although the liquid crystal layer 5 of the liquid crystal display device 1 comprises a nematic liquid crystal having a positive dielectric anisotropy, the liquid crystal layer 5 may be made of a nematic liquid crystal having a negative dielectric anisotropy. In this case, rubbing treatment is performed on the film surfaces of the alignment films 22 and 23 in directions perpendicular to a direction along the lengthwise direction of the elongated electrode portions 7 of each pixel electrode 6 (a direction parallel to the horizontal direction of the display area), and the liquid crystal molecules of the nematic liquid crystal having negative dielectric anisotropy are aligned such that the molecular long axes are aligned with a direction perpendicular to a direction along the lengthwise direction of the elongated electrode portions 7 of each pixel electrode 6.

A method of manufacturing the liquid crystal display device 1 will be described next with reference to FIG. 5 showing a manufacturing process for the liquid crystal display device 1. First of all, the front substrate 2 having one surface provided with the light-shielding film 20 and the color filters 21R, 21G, and 21B is prepared, together with the rear substrate 3 having one surface provided with the pixel electrodes 6, the opposed electrode 9, and TFTs 11 (step S1: substrate preparing step). The alignment films 22 and 23 are respectively formed on one surface of the front substrate 2 (the inner surface of the front substrate 2) and one surface of the rear substrate 3 (the inner surface of the rear substrate 3) (step S2: alignment film forming step). Rubbing treatment is then performed on the entire alignment films 22 and 23 in parallel directions (step S3: rubbing step). The seal member 4 is printed on the inner surface of one of the pair of substrates 2 and 3 so as to surround the region corresponding to the display area (step S4: seal member printing step). The pair of substrates 2 and 3 are overlapped while one surface of the front substrate 2 faces one surface of the rear substrate 3, and the seal member 4 is cured while the pair of substrates 2 and 3 are bonded to each other through the seal member 4, thereby joining the pair of substrates 2 and 3 through the seal member 4 (step S5: substrate joining step). A portion of the front substrate 2 which protrudes outside the seal member 4 and a portion of the rear substrate 3 which protrudes outside the terminal array portion 3a are cut off (step S6: substrate cutting step). A liquid crystal is injected into the region surrounded by the seal member 4 in the gap between the pair of substrates 2 and 3 through a liquid crystal filling hole (not shown) formed in part of the seal member in advance, and the liquid crystal filling hole is sealed thereafter (step S7: liquid crystal sealing step).

Figure 6A:
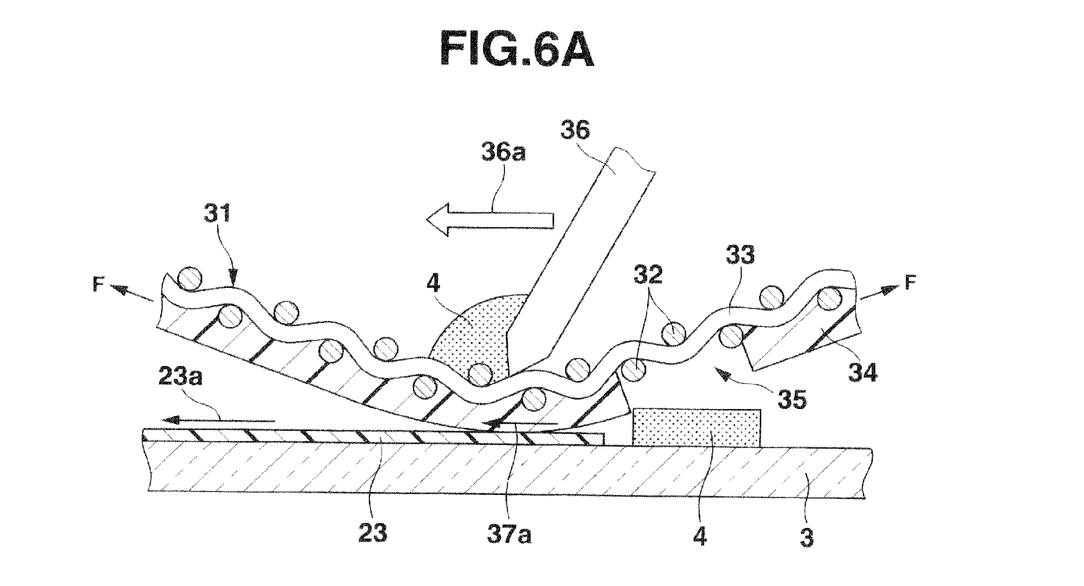
FIG. 6A is a sectional view showing a printing method for a seal member on the liquid crystal display device according to the first embodiment.
Figure 6B:
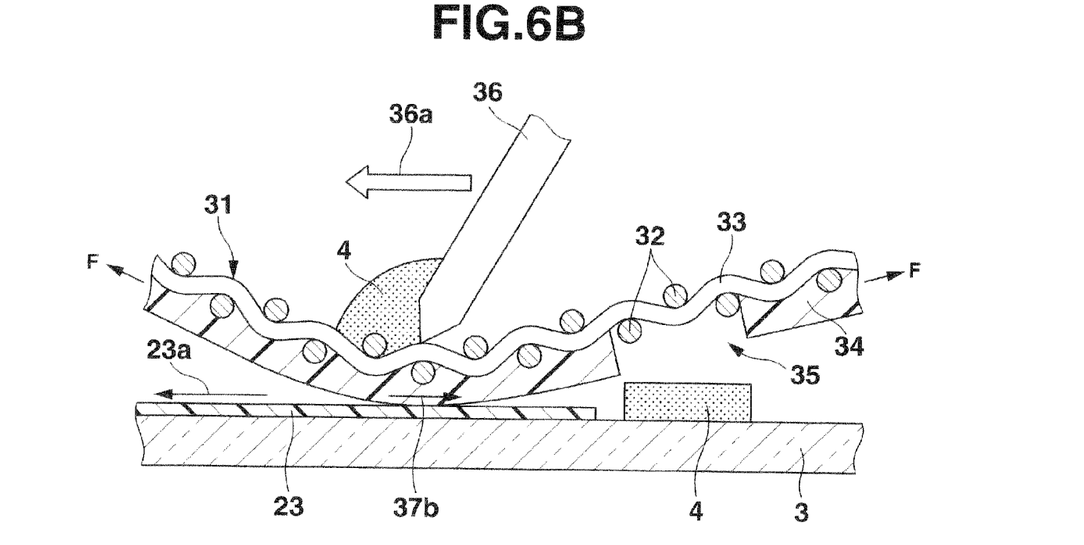
FIG. 6B is a sectional view showing the printing method for the seal member on the liquid crystal display device according to the first embodiment.

In the above manufacturing method, as shown in FIGS. 6A and 6B, the seal member 4 is printed on the inner surface of one of the pair of substrates 2 and 3, e.g., the rear substrate 3, by screen printing using a screen 31, which masks a non-print region, and a squeegee 36, which is brought into contact with the screen 31 and moved in a predetermined direction, and moving the squeegee 36 in a direction parallel to the rubbing direction 23a of the alignment film 23 formed on the inner surface of the rear substrate 3.

Note that the screen 31 is a mesh screen formed by weaving vertical and horizontal threads 32 and 33 made of stainless steel wires. The entire periphery of the screen is fixed to a support frame (not shown) in a strain state, and a mask layer 34 in which an opening portion 35 corresponding to a print pattern of the seal member 4 is formed is provided emulsion coating on the surface of the screen which faces the rear substrate 3.

In screen printing of the seal member 4 on the rear substrate 3, first of all, the screen 31 is placed above the rear substrate 3 through a predetermined gap such that end portions are arranged on the start point side and end point side of the alignment film 23 in a direction parallel to the rubbing direction 23a. In addition, the seal member 4 made of a thermosetting resin is supplied to one end portion of the respective end portions placed on the start point side and the end point side, e.g., onto the end portion side on the start point side of the rubbing direction 23a. After the distal end of the squeegee 36 is brought into contact with one end portion side of the screen 31 so as to press the screen 31 with a proper pressure. The squeegee 36 is then moved on the alignment film 23 from the start point side to the end point side in the rubbing direction 23a (in the direction indicated by an arrow 36a shown in FIGS. 1 and 6) at a constant speed.

When the distal end of the squeegee 36 is pressed on the screen 31 with a proper pressure and moved in a predetermined direction, the seal member 4 supplied onto the screen 31 is pushed out onto the rear substrate 3 through the opening portion 35 of the mask layer 34.

In screen printing of the seal member 4, the screen 31 is pulled in a moving direction 36a of the squeegee 36 as the squeegee 36 moves, as shown in FIG. 6A. When a strain force F, of a strain force F of the screen 31, which acts in a direction opposite to the moving direction 36a of the squeegee 36 becomes larger than the pulling force, the screen 31 is pulled by the stain force F in a direction opposite to the moving direction 36a of the squeegee 36, as shown in FIG. 6B.

In addition, since the squeegee 36 is brought into contact with the screen 31 with a predetermined pressing force and moved on the screen 31, a portion corresponding to the overlapping portion between the vertical and horizontal threads 32 and 33 of the screen 31 is pressed against the alignment film 23 formed on the inner surface of the rear substrate 3 by the squeegee 36.

For this reason, when the screen 31 is pulled in the moving direction 36a of the squeegee 36 as the squeegee 36 moves, the portion, of the surface of the alignment film 23 subjected to rubbing treatment, against which the screen 31 is pressed is worn by the screen 31 in a direction 37a coinciding with the moving direction 36a of the squeegee 36 (see FIG. 6A). When the screen 31 is pulled in a direction opposite to the moving direction 36a of the squeegee 36 by the strain force F in a direction opposite to the moving direction 36a of the squeegee 36 as the squeegee 36 moves, the alignment film is worn in a direction 37b opposite to the moving direction 36a of the squeegee 36 (see FIG. 6B).

According to this manufacturing method, since screen printing of the seal member 4 on the rear substrate 3 is performed by moving the squeegee 36 in a direction parallel to the rubbing direction 23a of the alignment film 23, the directions 37a and 37b in which the alignment film 23 is worn by the screen 31 are parallel to the rubbing direction 23a of the alignment film 23. Therefore, the portion of the alignment film 23 which is worn by the screen 31 has an alignment characteristic that aligns the molecular long axes the liquid crystal molecules 5a in a direction parallel to the rubbing direction 23a of the alignment film 23.

The direction in which the alignment film 23 is worn by the screen 31 when the screen 31 is pulled in the moving direction 36a of the squeegee 36 is opposite to the direction in which the alignment film 23 is worn by the screen 31 when the screen 31 is pulled in a direction opposite to the moving direction 36a of the squeegee 36. The alignment characteristic based on the first wearing operation (wearing operation in the same direction as the moving direction 36a of the squeegee 36) is almost canceled out by the alignment characteristic based on the second wearing operation (wearing operation in a direction opposite to the moving direction 36a of the squeegee 36). For this reason, the portion of the alignment film 23 which is worn by the screen 31 has the alignment characteristic based on the second wearing operation (the alignment characteristic that aligns the liquid crystal molecules 5a in a direction parallel to the rubbing direction 23a while being pre-tilted in a direction opposite to the rubbing direction 23a of the alignment film 23).

For this reason, after the pair of substrates 2 and 3 are joined to each other through the seal member 4, the liquid crystal molecules 5a of the liquid crystal layer 5 sealed in the gap between the pair of substrates 2 and 3 are set in an untwisted/aligned state such that the molecular long axes are aligned in the rubbing directions 22a and 23a of the alignment films 22 and 23 respectively formed on the inner surfaces of the pair of substrates 2 and 3 in the entire liquid crystal layer 5.

This manufacturing method can therefore suppress the occurrence of the disturbance of the alignment of the liquid crystal molecules 5a in the liquid crystal display device 1 in which the molecular long axes of the liquid crystal molecules 5a of the liquid crystal layer 5 are aligned in the rubbing directions 22a and 23a of the alignment films 22 and 23 by performing rubbing treatment on the alignment films 22 and 23 respectively formed on the opposed inner surfaces of the pair of substrates 2 and 3 in parallel directions.

According to this manufacturing method, it suffices if the shift angle of the moving direction 36a of the squeegee 36 in screen printing of the seal member 4 with respect to the rubbing direction 23a of the alignment film 23 formed on the inner surface of one substrate (the rear substrate in this embodiment) 3, on which the seal member 4 is printed, is set in a direction within the range of ±10°. The method can manufacture the liquid crystal display device 1 while suppressing the occurrence of the disturbance of the alignment of the liquid crystal molecules 5a by printing the seal member 4 while moving the squeegee 36 in the direction within this range.

The liquid crystal display device 1 manufactured by the manufacturing method according to this embodiment can obtain display with good contrast because the occurrence of the disturbance of the alignment of the liquid crystal molecules 5a is suppressed, and the molecular long axes of the liquid crystal molecules 5a are aligned with the rubbing directions 22a and 23a of the alignment films 22 and 23.

The following are contrast values Cr respectively obtained by a liquid crystal display device (to be referred to as a display device A hereinafter) manufactured by a method of printing the seal member 4 by moving the squeegee 36 in a direction at an angle of 90° with respect to the rubbing direction 23a of the alignment film 23 formed on the inner surface of one substrate 3, a liquid crystal display device as a comparative example (to be referred to as a display device B hereinafter) manufactured by a method of printing the seal member 4 by moving the squeegee 36 in a direction at an angle of 0° with respect to the rubbing direction 23a of the alignment film 23, and a liquid crystal display device (to be referred to as a display device C hereinafter) manufactured by a method of printing the seal member 4 by moving the squeegee 36 in a direction at an angle of 10° with respect to the rubbing direction 23a of the alignment film 23:

display device A $Cr_A$=570
display device B $Cr_B$=900
display device C $Cr_C$=1020

The comparison between the display devices A, B, and C indicates that in the display device A, the direction in which each overlapping portion of vertical and horizontal threads of the screen wears the alignment film is perpendicular to the rubbing direction of the alignment film, and hence the liquid crystal molecules of the portion are oriented in a direction perpendicular to the rubbing direction to cause an alignment failure, and light leaks from the portion, resulting in a decrease in contrast.

In the display devices B and C manufactured by the manufacturing method according to this embodiment, even if a portion corresponding to each overlapping portion between vertical and horizontal threads of the screen wears an alignment film, since the direction is parallel to the rubbing direction of the alignment film, no irregularity occurs in the aligning direction of liquid crystal molecules. For this reason, since the liquid crystal molecules are uniformly aligned, the display devices B and C each provide display with much higher contrast than that obtained by the display device A as a comparative example.

Second Embodiment

On the manufacturing method of the first embodiment, the seal member 4 is printed by moving the squeegee 36 in the same direction as the rubbing direction 23a of the alignment film 23 formed on the inner surface of one substrate 3. However, the seal member 4 can be printed by moving the squeegee 36 in a direction opposite to that in the first embodiment.

Figure 7A:
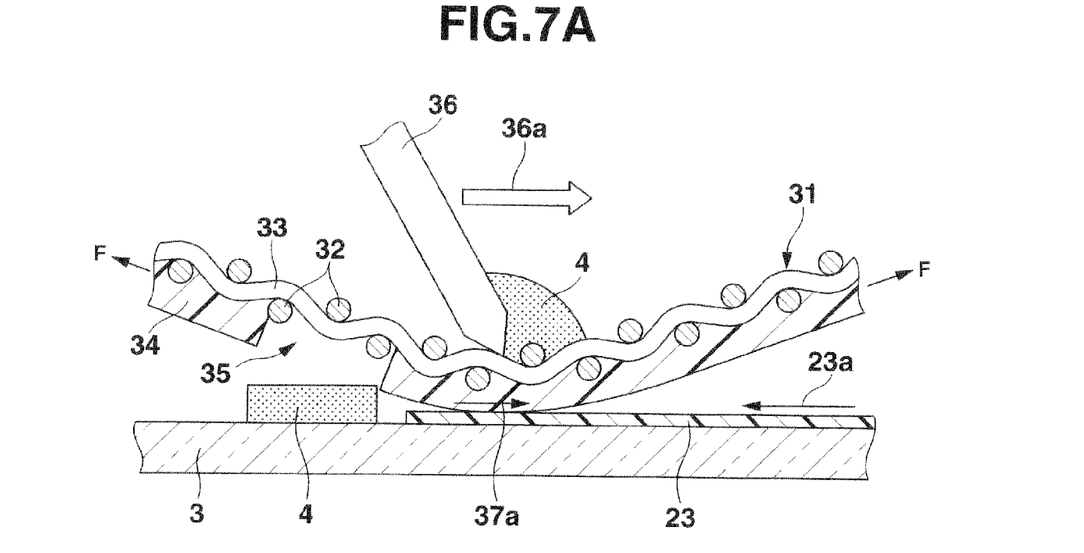
FIG. 7A is a sectional view showing a printing method for a seal member on a liquid crystal display device according to the second embodiment of the present invention.
Figure 7B:
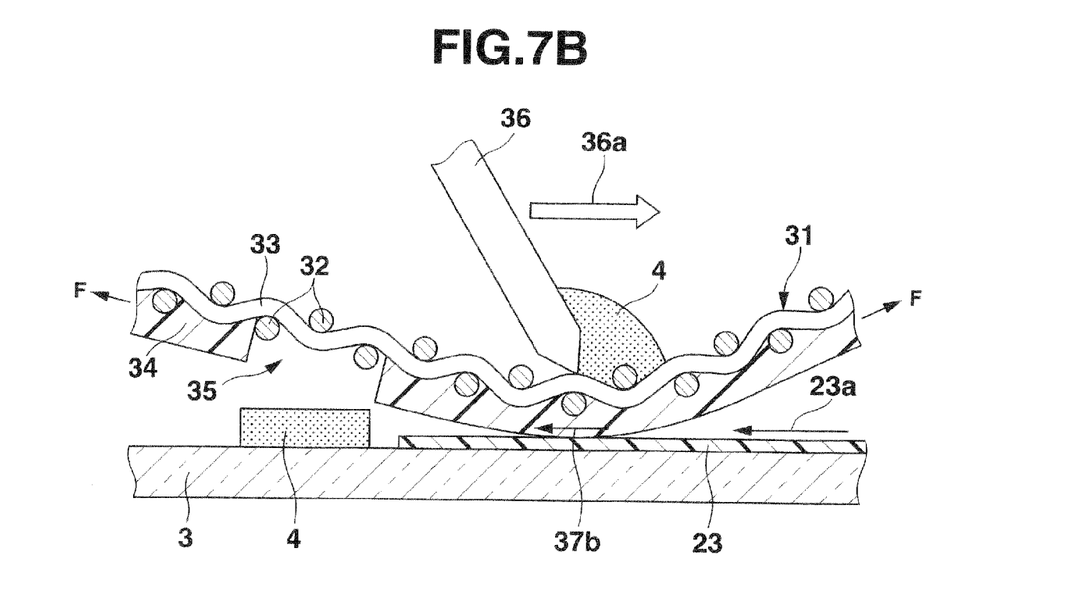
FIG. 7B is a sectional view showing the printing method for the seal member on the liquid crystal display device according to the second embodiment of the present invention.

FIGS. 7A and 7B are views showing a seal member printing method according to the second embodiment of the present invention. In this embodiment, screen printing of a seal member 4 is performed by moving a squeegee 36 in a direction parallel and opposite to a rubbing direction 23a of an alignment film 23 formed on the inner surface of one substrate 3.

Note that this seal member printing method is the same as that in the first embodiment except that a moving direction 36a of the squeegee 36 is opposite to that in the first embodiment. Therefore, the same reference numerals as in the first embodiment denote the same parts in the second embodiment, and a repetitive description will be omitted.

According to the manufacturing method of this embodiment, since the seal member 4 is printed by moving the squeegee 36 in a direction opposite to that in the first embodiment, a portion of the alignment film 23 which is worn by the screen 31 has an alignment characteristic that aligns liquid crystal molecules 5a in a direction parallel to the rubbing direction 23a while being pre-tilted in the same direction as the rubbing direction 23a of the alignment film 23. This makes it possible to manufacture the liquid crystal display device 1 while suppressing the occurrence of the disturbance of the alignment of the liquid crystal molecules 5a.

Other Embodiments

Note that the above method of manufacturing a liquid crystal display device is not limited to the manufacture of the above liquid crystal display device 1 and can also be applied to the manufacture of other types of devices such as a lateral electric field control liquid crystal display device. For example, the above manufacturing method can be applied to a lateral electric field control liquid crystal display device in which first electrodes on which elongated electrode portions each having an elongated shape are formed parallel at intervals are provided on one surface of one of a pair of substrates which is a rear substrate (first substrate) so as to correspond to predetermined unit regions for the formation of pixels, together with a second electrode which is placed closer to the opposite side to the rear substrate side than the first electrodes so as to be insulated from them, and generates, upon application of a voltage between the second electrode and the first electrode, a lateral electric field between the elongated electrode portions of the first electrode and the second electrode so as to change the molecular long axis direction of liquid crystal molecules existing in a region, of the liquid crystal layer, which overlaps the first electrode to a direction parallel to one surface of the rear substrate, and one pair of alignment films are subjected to rubbing treatment in one of a direction parallel to the lengthwise direction of the elongated electrode portions of the first electrode and a direction perpendicular to the lengthwise direction so as to align the liquid crystal molecules parallel to one surface of the rear substrate with the molecular long axes of the liquid crystal molecules being aligned in the rubbing directions of the alignment films.

The above method of manufacturing a liquid crystal display device is not limited to the manufacture of the liquid crystal display device 1 described above which is of a lateral electric field control type and can also be applied to the manufacture of other types of devices such as an untwisted/aligned liquid crystal display device. For example, the above manufacturing method can be applied to the manufacture of an untwisted homogeneous alignment type liquid crystal display device in which pixel electrodes each formed into a pixel shape are provided on one surface of a rear substrate (first substrate) as one of a pair of substrates so as to correspond to predetermined unit regions for the formation of pixels, an opposed electrode which generates, upon application of a voltage between itself and pixel electrodes, an electric field between the opposed electrode and the pixel electrodes so as to change the molecular long axis direction of liquid crystal molecules existing in a region, of the liquid crystal layer, which overlaps the first electrode to the thickness direction of the liquid crystal layer is provided on one surface of a front substrate (second substrate) as the other substrate of the pair of substrates so as to face the pixel electrodes, and alignment films each formed on one surface of each of the pair of substrates are subjected to rubbing treatment in predetermined parallel and opposite directions so as to align the liquid crystal molecules parallel to one surface of the rear substrate with the molecular long axes of the liquid crystal molecules being aligned in the rubbing directions of the alignment films.

In addition, the above method of a liquid crystal display device can also be applied to the manufacture of a bend alignment type liquid crystal display device in which pixel electrodes each formed into a pixel shape are provided on the inner surface of a rear substrate (first substrate) as one of a pair of substrates so as to correspond to predetermined unit regions for the formation of pixels, an opposed electrode which generates, upon application of a voltage between itself and pixel electrodes, an electric field between the opposed electrode and the pixel electrodes so as to change the molecular long axis direction of liquid crystal molecules existing in a region, of the liquid crystal layer, which overlaps the first electrode to the thickness direction of the liquid crystal layer is provided on the inner surface of a front substrate (second substrate) as the other substrate of the pair of substrates so as to face the pixel electrodes, and alignment films each formed on one surface of each of the pair of substrates are subjected to rubbing treatment in predetermined parallel and same directions so as to splay-align the liquid crystal molecules between the pair of substrates with the molecular long axes of the liquid crystal molecules being aligned in the rubbing directions of the alignment films.

Note that in each embodiment described above, the light-shielding film 20 and the color filters 21R, 21G, and 21B may be provided on the rear substrate 3, and the pixel electrodes 6, the opposed electrode 9, and TFTs 11 may be provided on the front substrate 2.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents

What is claimed is:

1. A method of manufacturing a liquid crystal display device, the method comprising:
   preparing a first substrate and a second substrate;
   forming alignment films on one surface of the first substrate and one surface of the second substrate, respectively;
   performing rubbing treatment on a surface of each of the alignment films;
   screen-printing a seal member on said one surface of the first substrate so as to surround a display area; and
   stacking the first substrate and the second substrate on each other while said one surface of the first substrate faces said one surface of the second substrate, with a rubbing direction of the alignment film on the first substrate being parallel to a rubbing direction of the alignment film on the second substrate, and joining the first substrate and the second substrate through the seal member by curing the seal member while the first substrate and the second substrate are bonded to each other through the seal member;
   wherein in the step of screen-printing the seal member, printing is performed while a squeegee which is brought into contact with a screen and moved in a predetermined direction is moved from a start point side to an end point side, in the rubbing direction of the alignment film formed on said one surface of the first substrate, in a range in which a shift angle with respect to the rubbing direction of the alignment film formed on said one surface of the first substrate is not more than ±10°.

2. The method according to claim 1, wherein the liquid crystal display device to be manufactured is a lateral electric field control liquid crystal display device in which first electrodes in which elongated electrode portions each having an elongated shape are formed in parallel at intervals are provided on said one surface of one of the first substrate and the second substrate so as to correspond to predetermined unit regions for formation of pixels, together with a second electrode which is placed to intervene between the first electrodes and said one substrate so as to be insulated from the first electrodes;
   wherein the lateral electric field control liquid crystal display device generates, upon application of a voltage between the second electrode and one of the first electrodes, a lateral electric field between the elongated electrode portions of the first electrode and the second electrode so as to change a molecular long axis direction of liquid crystal molecules existing in a region of the liquid crystal layer that overlaps the first electrode to a direction parallel to said one surface of said one substrate; and
   wherein the pair of alignment films are subjected to rubbing treatment in one of a direction parallel to a lengthwise direction of the elongated electrode portions of the first electrodes and a direction perpendicular to the lengthwise direction so as to align the liquid crystal molecules parallel to said one surface of said one substrate with molecular long axes of the liquid crystal molecules being aligned in the rubbing directions of the alignment films.

3. The method according to claim 1, wherein the liquid crystal display device to be manufactured is a lateral electric field control liquid crystal display device in which first electrodes are provided on said one surface of one of the first substrate and the second substrate together with a second electrode, elongated electrode portions each having an elongated shape are formed in parallel at intervals, in the first electrodes, so as to correspond to predetermined unit regions for formation of pixels, and the second electrode is placed such that the first electrodes intervene between the second electrode and said one substrate such that the second electrode is insulated from the first electrodes;
   wherein the lateral electric field control liquid crystal display device generates, upon application of a voltage between the second electrode and one of the first electrodes, a lateral electric field between the elongated electrode portions of the first electrode and the second electrode so as to change a molecular long axis direction of liquid crystal molecules existing in a region of the liquid crystal layer that overlaps the first electrode to a direction parallel to said one surface of said one substrate; and
   wherein the pair of alignment films are subjected to rubbing treatment in one of a direction parallel to a lengthwise direction of the elongated electrode portions of the first electrodes and a direction perpendicular to the lengthwise direction so as to align the liquid crystal molecules parallel to said one surface of said one substrate with molecular long axes of the liquid crystal molecules being aligned in the rubbing directions of the alignment films.

4. The method according to claim 1, wherein the liquid crystal display device to be manufactured is an untwisted homogeneous alignment type liquid crystal display device in which pixel electrodes each formed into a shape of a pixel are provided on said one surface of one of the first substrate and the second substrate so as to correspond to predetermined unit regions for formation of pixels;
   wherein an opposed electrode which generates, upon application of a voltage between the opposed electrode and one of the pixel electrodes, an electric field between the opposed electrode and the pixel electrode so as to change a molecular long axis direction of liquid crystal molecules existing in a region of the liquid crystal layer that overlaps the first electrode to a thickness direction of the liquid crystal layer, is provided on said one surface of the other substrate of the first substrate and the second substrate so as to face the pixel electrodes; and
   wherein the alignment films are subjected to rubbing treatment in predetermined parallel and opposite directions so as to align the liquid crystal molecules parallel to said one surface of said one substrate with molecular long axes of the liquid crystal molecules being aligned in the rubbing directions of the alignment films.

5. The method according to claim 1, wherein the liquid crystal display device to be manufactured is a bend alignment type liquid crystal display device in which pixel electrodes each formed into a shape of a pixel are provided on said one surface of one substrate of the first substrate and the second substrate so as to correspond to predetermined unit regions for formation of pixels;

wherein an opposed electrode which generates, upon application of a voltage between the opposed electrode and one of the pixel electrodes, an electric field between the opposed electrode and the pixel electrode so as to change a molecular long axis direction of liquid crystal molecules existing in a region of the liquid crystal layer that overlaps the first electrode to a thickness direction of the liquid crystal layer, is provided on said one surface of the other substrate of the first substrate and the second substrate so as to face the pixel electrodes; and wherein the alignment films are subjected to rubbing treatment in predetermined parallel and same directions so as to splay-align the liquid crystal molecules between the pair of substrates with molecular long axes of the liquid crystal molecules being aligned in the rubbing directions of the alignment films.

6. A method of manufacturing a liquid crystal display device, the method comprising:

preparing a first substrate and a second substrate;

forming alignment films on one surface of the first substrate and one surface of the second substrate, respectively;

performing rubbing treatment on a surface of each of the alignment films;

screen-printing a seal member on said one surface of the first substrate so as to surround a display area; and stacking the first substrate and the second substrate on each other while said one surface of the first substrate faces said one surface of the second substrate, with a rubbing direction of the alignment film on the first substrate being parallel to a rubbing direction of the alignment film on the second substrate, and joining the first substrate and the second substrate through the seal member by curing the seal member while the first substrate and the second substrate are bonded to each other through the seal member;

wherein in the step of screen-printing the seal member, printing is performed while a squeegee which is brought into contact with a screen and moved in a predetermined direction is moved from an end point side to a start point side, in the rubbing direction of the alignment film formed on said one surface of the first substrate, in a range in which a shift angle with respect to the rubbing direction of the alignment film formed on said one surface of the first substrate is not more than ±10°;

wherein the liquid crystal display device to be manufactured is a lateral electric field control liquid crystal display device in which first electrodes in which elongated electrode portions each having an elongated shape are formed in parallel at intervals are provided on said one surface of one of the first substrate and the second substrate so as to correspond to predetermined unit regions for formation of pixels, together with a second electrode which is placed to intervene between the first electrodes and said one substrate so as to be insulated from the first electrodes;

wherein the lateral electric field control liquid crystal display device generates, upon application of a voltage between the second electrode and one of the first electrodes, a lateral electric field between the elongated electrode portions of the first electrode and the second electrode so as to change a molecular long axis direction of liquid crystal molecules existing in a region of the liquid crystal layer that overlaps the first electrode to a direction parallel to said one surface of said one substrate; and wherein the pair of alignment films are subjected to rubbing treatment in one of a direction parallel to a lengthwise direction of the elongated electrode portions of the first electrodes and a direction perpendicular to the lengthwise direction so as to align the liquid crystal molecules parallel to said one surface of said one substrate with molecular long axes of the liquid crystal molecules being aligned in the rubbing directions of the alignment films.

7. A method of manufacturing a liquid crystal display device, the method comprising:

preparing a first substrate and a second substrate;

forming alignment films on one surface of the first substrate and one surface of the second substrate, respectively;

performing rubbing treatment on a surface of each of the alignment films;

screen-printing a seal member on said one surface of the first substrate so as to surround a display area; and stacking the first substrate and the second substrate on each other while said one surface of the first substrate faces said one surface of the second substrate, with a rubbing direction of the alignment film on the first substrate being parallel to a rubbing direction of the alignment film on the second substrate, and joining the first substrate and the second substrate through the seal member by curing the seal member while the first substrate and the second substrate are bonded to each other through the seal member;

wherein in the step of screen-printing the seal member, printing is performed while a squeegee which is brought into contact with a screen and moved in a predetermined direction is moved from an end point side to a start point side, in the rubbing direction of the alignment film formed on said one surface of the first substrate, in a range in which a shift angle with respect to the rubbing direction of the alignment film formed on said one surface of the first substrate is not more than ±10°;

wherein the liquid crystal display device to be manufactured is a lateral electric field control liquid crystal display device in which first electrodes are provided on said one surface of one of the first substrate and the second substrate together with a second electrode, elongated electrode portions each having an elongated shape are formed in parallel at intervals, in the first electrodes, so as to correspond to predetermined unit regions for formation of pixels, and the second electrode is placed such that the first electrodes intervene between the second electrode and said one substrate such that the second electrode is insulated from the first electrodes;

wherein the lateral electric field control liquid crystal display device generates, upon application of a voltage between the second electrode and one of the first electrodes, a lateral electric field between the elongated electrode portions of the first electrode and the second electrode so as to change a molecular long axis direction of liquid crystal molecules existing in a region of the liquid crystal layer that overlaps the first electrode to a direction parallel to said one surface of said one substrate; and wherein the pair of alignment films are subjected to rubbing treatment in one of a direction parallel to a lengthwise direction of the elongated electrode portions of the first electrodes and a direction perpendicular to the lengthwise direction so as to align the liquid crystal molecules parallel to said one surface of said one substrate with molecular long axes of the liquid crystal molecules being aligned in the rubbing directions of the alignment films.

8. A method of manufacturing a liquid crystal display device, the method comprising:
preparing a first substrate and a second substrate;
forming alignment films on one surface of the first substrate and one surface of the second substrate, respectively;
performing rubbing treatment on a surface of each of the alignment films;
screen-printing a seal member on said one surface of the first substrate so as to surround a display area; and
stacking the first substrate and the second substrate on each other while said one surface of the first substrate faces said one surface of the second substrate, with a rubbing direction of the alignment film on the first substrate being parallel to a rubbing direction of the alignment film on the second substrate, and joining the first substrate and the second substrate through the seal member by curing the seal member while the first substrate and the second substrate are bonded to each other through the seal member;
wherein in the step of screen-printing the seal member, printing is performed while a squeegee which is brought into contact with a screen and moved in a predetermined direction is moved from an end point side to a start point side, in the rubbing direction of the alignment film formed on said one surface of the first substrate, in a range in which a shift angle with respect to the rubbing direction of the alignment film formed on said one surface of the first substrate is not more than ±10°;
wherein the liquid crystal display device to be manufactured is an untwisted homogeneous alignment type liquid crystal display device in which pixel electrodes each formed into a shape of a pixel are provided on said one surface of one of the first substrate and the second substrate so as to correspond to predetermined unit regions for formation of pixels;
wherein an opposed electrode which generates, upon application of a voltage between the opposed electrode and one of the pixel electrodes, an electric field between the opposed electrode and the pixel electrode so as to change a molecular long axis direction of liquid crystal molecules existing in a region of the liquid crystal layer that overlaps the first electrode to a thickness direction of the liquid crystal layer, is provided on said one surface of the other substrate of the first substrate and the second substrate so as to face the pixel electrodes; and
wherein the alignment films are subjected to rubbing treatment in predetermined parallel and opposite directions so as to align the liquid crystal molecules parallel to said one surface of said one substrate with molecular long axes of the liquid crystal molecules being aligned in the rubbing directions of the alignment films.

9. A method of manufacturing a liquid crystal display device, the method comprising:
preparing a first substrate and a second substrate;
forming alignment films on one surface of the first substrate and one surface of the second substrate, respectively;
performing rubbing treatment on a surface of each of the alignment films;
screen-printing a seal member on said one surface of the first substrate so as to surround a display area; and
stacking the first substrate and the second substrate on each other while said one surface of the first substrate faces said one surface of the second substrate, with a rubbing direction of the alignment film on the first substrate being parallel to a rubbing direction of the alignment film on the second substrate, and joining the first substrate and the second substrate through the seal member by curing the seal member while the first substrate and the second substrate are bonded to each other through the seal member;
wherein in the step of screen-printing the seal member, printing is performed while a squeegee which is brought into contact with a screen and moved in a predetermined direction is moved from an end point side to a start point side, in the rubbing direction of the alignment film formed on said one surface of the first substrate, in a range in which a shift angle with respect to the rubbing direction of the alignment film formed on said one surface of the first substrate is not more than ±10°;
wherein the liquid crystal display device to be manufactured is a bend alignment type liquid crystal display device in which pixel electrodes each formed into a shape of a pixel are provided on said one surface of one substrate of the first substrate and the second substrate so as to correspond to predetermined unit regions for formation of pixels;
wherein an opposed electrode which generates, upon application of a voltage between the opposed electrode and one of the pixel electrodes, an electric field between the opposed electrode and the pixel electrode so as to change a molecular long axis direction of liquid crystal molecules existing in a region of the liquid crystal layer that overlaps the first electrode to a thickness direction of the liquid crystal layer, is provided on said one surface of the other substrate of the first substrate and the second substrate so as to face the pixel electrodes; and
wherein the alignment films are subjected to rubbing treatment in predetermined parallel and same directions so as to splay-align the liquid crystal molecules between the pair of substrates with molecular long axes of the liquid crystal molecules being aligned in the rubbing directions of the alignment films.

10. The method according to any one of claims 1 to 9, further comprising cutting off a portion of one of the first substrate and the second substrate which protrudes outside the seal member and a portion of the other of the first substrate and the second substrate which protrudes outside a terminal array portion provided with scanning line terminals and signal line terminals, after joining the first substrate and the second substrate.

11. The method according to claim 10, further comprising injecting a liquid crystal into a region surrounded by the seal member in a gap between the first substrate and the second substrate through a liquid crystal filling hole formed in part of the seal member in advance and then sealing the liquid crystal filling hole, after the step of stacking the first substrate and the second substrate.

* * * * *